(12) United States Patent
Chen et al.

(10) Patent No.: US 11,749,266 B2
(45) Date of Patent: Sep. 5, 2023

(54) VOICE COMMANDS ACROSS DEVICES

(71) Applicant: Google LLC, Mountain View, CA (US)

(72) Inventors: Jennifer Shien-Ming Chen, San Francisco, CA (US); Alexander Friedrich Kuscher, San Francisco, CA (US); Mitsuru Oshima, San Jose, CA (US)

(73) Assignee: Google LLC, Mountain View, CA (US)

( * ) Notice: Subject to any disclaimer, the term of this patent is extended or adjusted under 35 U.S.C. 154(b) by 179 days.

(21) Appl. No.: 16/896,061

(22) Filed: Jun. 8, 2020

(65) Prior Publication Data

US 2020/0302930 A1 Sep. 24, 2020

Related U.S. Application Data (60) Continuation of application No. 15/595,802, filed on May 15, 2017, now Pat. No. 10,714,083, which is a
(Continued)

(51) Int. Cl.
*G10L 15/22* (2006.01)
*G10L 25/78* (2013.01)
(Continued)

(52) U.S. Cl.
CPC .............. *G10L 15/22* (2013.01); *G06F 3/167* (2013.01); *G10L 15/30* (2013.01); *G10L 15/32* (2013.01);
(Continued)

(58) Field of Classification Search
CPC ... G10L 15/22; G10L 2015/223; G10L 15/30; G10L 15/32; G10L 25/78; G06F 3/167;
(Continued)

(56) References Cited

U.S. PATENT DOCUMENTS

| 6,697,782 B1 | 2/2004 | Iso-Sipila et al. |
| 7,464,035 B2 | 12/2008 | Funk et al. |

(Continued)

FOREIGN PATENT DOCUMENTS

| CN | 104145304 A | 11/2014 |
| CN | 104284257 A | 1/2015 |

(Continued)

OTHER PUBLICATIONS

International Search Report and Written Opinion from International Application No. PCT/US2016/057519, dated Feb. 3, 2017.
(Continued)

*Primary Examiner* — Thuykhanh Le
(74) *Attorney, Agent, or Firm* — Honigman LLP; Brett A. Krueger; Grant J. Griffith (57) ABSTRACT

Aspects of the subject technology relate to a method for using a voice command for multiple computing devices. First voice input data is received from a first computing device associated with a user account, where the first voice input data comprises a first voice command captured at the first computing device. Second voice input data is received from a second computing device associated with the user account where the second voice input data comprises a second voice command captured at the second computing device. An intended voice command is determined based on the obtained first and second voice input data. Based on the intended voice command, a first target computing device is determined. First instructions associated with the intended voice command are provided to the first target computing device for execution.

20 Claims, 4 Drawing Sheets

Related U.S. Application Data division of application No. 14/935,350, filed on Nov. 6, 2015, now Pat. No. 9,653,075.

(51) Int. Cl.

| | | |
|---|---|---|
| *G10L 15/32* | (2013.01) | |
| *G06F 3/16* | (2006.01) | |
| *G10L 15/30* | (2013.01) | |
| *H04L 12/46* | (2006.01) | |
| *G06F 9/451* | (2018.01) | |

(52) U.S. Cl.
CPC .......... *G10L 25/78* (2013.01); *H04L 12/4625* (2013.01); *G06F 9/451* (2018.02); *G10L 2015/223* (2013.01)

(58) Field of Classification Search
CPC ... G06F 9/451; H04L 12/4625; H04L 12/282; H04L 12/2829; H04L 12/2832; H04L 67/306
See application file for complete search history.

(56) References Cited

U.S. PATENT DOCUMENTS

| | | | |
|---|---|---|---|
| 7,668,990 B2* | 2/2010 | Krzyzanowski ... | H04N 21/4131 710/72 |
| 8,271,287 B1* | 9/2012 | Kermani .......... | H04N 21/42222 704/275 |
| 8,284,950 B2 | 10/2012 | Riggs | |
| 8,340,975 B1 | 12/2012 | Rosenberger | |
| 8,566,091 B2 | 10/2013 | Low et al. | |
| 8,584,221 B2* | 11/2013 | Mazur ............... | H04L 63/0846 726/8 |
| 8,918,411 B1* | 12/2014 | Latif ............... | H04L 65/403 707/790 |
| 9,293,134 B1 | 3/2016 | Saleem et al. | |
| 9,318,107 B1 | 4/2016 | Sharifi | |
| 9,472,193 B2* | 10/2016 | Nishikawa ......... | G10L 15/22 |
| 9,595,171 B2* | 3/2017 | Hurtig .............. | G06F 3/0487 |
| 9,928,839 B1* | 3/2018 | Lester .............. | H04L 63/105 |
| 9,984,686 B1* | 5/2018 | Mutagi ............. | G10L 15/26 |
| 10,181,323 B2 | 1/2019 | Beckhardt et al. | |
| 10,257,577 B2* | 4/2019 | Arling .............. | H04N 21/6332 |
| 10,601,604 B2* | 3/2020 | Kozura ............ | H04L 12/2832 |
| 2003/0109270 A1* | 6/2003 | Shorty .............. | H04W 40/02 455/445 |
| 2005/0159823 A1* | 7/2005 | Hayes .............. | H04L 12/2803 700/19 |
| 2006/0009980 A1 | 1/2006 | Burke et al. | |
| 2006/0074658 A1 | 4/2006 | Chadha | |
| 2006/0271993 A1* | 11/2006 | Nakata ............. | H04L 12/2829 725/135 |
| 2007/0185597 A1* | 8/2007 | Bejean .............. | G08C 17/00 700/83 |
| 2008/0033724 A1* | 2/2008 | Block ............... | G10L 15/22 704/E15.04 |
| 2009/0271203 A1 | 10/2009 | Resch et al. | |
| 2010/0138224 A1* | 6/2010 | Bedingfield, Sr. ... | G10L 15/22 704/E15.001 |
| 2010/0312547 A1 | 12/2010 | Van Os et al. | |
| 2011/0157479 A1* | 6/2011 | Higuchi ........... | H04N 5/44 348/734 |
| 2011/0257973 A1* | 10/2011 | Chutorash ......... | G01C 21/3661 701/1 |
| 2012/0117590 A1 | 5/2012 | Agnihotri et al. | |
| 2013/0042026 A1* | 2/2013 | Shinomiya ........ | H04L 12/282 710/5 |
| 2013/0073293 A1* | 3/2013 | Jang ................. | G10L 15/22 704/E21.001 |
| 2013/0090169 A1 | 4/2013 | Liu et al. | |
| 2013/0238326 A1 | 9/2013 | Kim et al. | |
| 2013/0290911 A1* | 10/2013 | Praphul ............. | G06F 3/038 715/863 |
| 2014/0012587 A1 | 1/2014 | Park | |
| 2014/0059287 A1* | 2/2014 | Bains ................ | G11C 7/02 711/106 |
| 2014/0095780 A1* | 4/2014 | Bains ................ | G11C 7/1072 711/105 |
| 2014/0257807 A1 | 9/2014 | Mauro et al. | |
| 2014/0330569 A1* | 11/2014 | Kolavennu ........ | G10L 15/1815 704/275 |
| 2014/0337032 A1 | 11/2014 | Aleksic et al. | |
| 2015/0019219 A1 | 1/2015 | Tzirkel-Hancock et al. | |
| 2015/0026580 A1 | 1/2015 | Kang et al. | |
| 2015/0039319 A1 | 2/2015 | Mei et al. | |
| 2015/0040012 A1 | 2/2015 | Faaborg et al. | |
| 2015/0082175 A1 | 3/2015 | Onohara et al. | |
| 2015/0087278 A1* | 3/2015 | Kim ................. | H04L 63/062 455/414.1 |
| 2015/0088518 A1* | 3/2015 | Kim ................. | G10L 17/22 704/251 |
| 2015/0100313 A1* | 4/2015 | Sharma ............. | G10L 15/28 704/235 |
| 2015/0154976 A1* | 6/2015 | Mutagi ............. | G06F 3/167 704/275 |
| 2015/0162006 A1 | 6/2015 | Kummer | |
| 2015/0170652 A1* | 6/2015 | Kaplan ............. | G10L 15/22 704/246 |
| 2015/0228274 A1 | 8/2015 | Leppanen et al. | |
| 2015/0287413 A1 | 10/2015 | Jung et al. | |
| 2015/0302857 A1 | 10/2015 | Yamada | |
| 2015/0348551 A1* | 12/2015 | Gruber .............. | G10L 15/1822 704/235 |
| 2015/0348554 A1* | 12/2015 | Orr ................... | H04L 12/2816 704/275 |
| 2016/0005404 A1 | 1/2016 | Yokoya et al. | |
| 2016/0011853 A1 | 1/2016 | Rogers et al. | |
| 2016/0078870 A1* | 3/2016 | Helm ............... | G10L 25/48 704/275 |
| 2016/0110159 A1 | 4/2016 | Ono et al. | |
| 2016/0155443 A1* | 6/2016 | Khan ............... | G06F 3/167 704/275 |
| 2016/0162259 A1 | 6/2016 | Zhao et al. | |
| 2016/0321266 A1 | 11/2016 | Philippov et al. | |
| 2016/0358460 A1* | 12/2016 | Lee ................. | G08C 17/02 |
| 2017/0076720 A1 | 3/2017 | Gopalan et al. | |
| 2017/0133011 A1 | 5/2017 | Chen et al. | |
| 2017/0365251 A1* | 12/2017 | Park ................. | G10L 15/197 |
| 2021/0326103 A1* | 10/2021 | Mutagi ............. | G10L 15/22 |

FOREIGN PATENT DOCUMENTS

| | | | | |
|---|---|---|---|---|
| CN | 104604274 A | | 5/2015 | |
| WO | 2014007545 A1 | | 1/2014 | |
| WO | 20158009122 | | 1/2015 | |
| WO | 2015017043 A1 | | 2/2015 | |
| WO | WO-2016105808 A1 * | | 6/2016 | ............. G06F 3/167 |

OTHER PUBLICATIONS

CN Office Action issued in Chinese Application No. 201680042544.1, dated Mar. 26, 2019, 9 pages (with English translation).
EP Office Action issued in European Application No. 16790803.7, dated Apr. 5, 2019, 4 pages.
International Search Report and Written Opinion for International Application No. 21185794.1, dated Oct. 21, 2021, 14 pages.
Chinese Office Action issued in Chinese Application No. 201910796762.X, dated Dec. 23, 2022, 24 pages (with English translation).

* cited by examiner

VOICE COMMANDS ACROSS DEVICES

CROSS-REFERENCE TO RELATED APPLICATION

This U.S. patent application is a continuation of, and claims priority under 35 U.S.C. § 120 from, U.S. patent application Ser. No. 15/595,802, filed on May 15, 2017, which is a divisional of, and claims priority under 35 U.S.C. § 121 from, U.S. patent application Ser. No. 14/935,350, filed on Nov. 6, 2015. The disclosures of these prior applications are considered part of the disclosure of this application and are hereby incorporated by reference in their entireties.

BACKGROUND

Computing devices have become more varied and ubiquitous with an increasing number of everyday objects gaining the ability to connect to the internet and process information. One way to interact with these types of computing devices is through voice commands. As the number of computing devices capable of recognizing and responding to voice commands increases, multiple computing devices may capture a same command, which may lead to conflicts or redundancies in executing the command. Currently, there are no standards that allow multiple computing devices to work together to determine the intended voice command and to determine the target computing device based on the intended voice command.

SUMMARY

Aspects of the subject technology relate to a computer-implemented method for using voice commands for one or more computing devices. The method includes receiving first voice input data from a first computing device associated with a user account, where the first voice input data comprise a first voice command captured at the first computing device. The method further includes receiving second voice input data from a second computing device associated with the user account, where the second voice input data comprise a second voice command captured at the second computing device. The method further includes determining an intended voice command based on the obtained first and second voice input data. The method further includes determining a first target computing device based on the intended voice command. The method further includes providing first instructions associated with the intended voice command to the first target computing device for execution.

Aspects of the subject also relates to a system. The system includes one or more processors and a non-transitory computer-readable medium including instructions stored therein, which, when processed by the one or more processors, cause the one or more processors to perform operations. The operations include receiving first voice input data from a first computing device associated with a user account, where the first voice input data comprise a first voice command captured at the first computing device and a first timestamp associated with the first voice command. The operations also include receiving second voice input data from a second computing device associated with the user account, where the second voice input data comprise a second voice command captured at the second computing device and a second timestamp associated with the second voice command. The operations also include determining an intended voice command based on the obtained first and second voice input data. The operations also include determining a first target computing device based on the intended voice command. The operations also include providing first instructions associated with the intended voice command to the first target computing device for execution.

Aspects of the subject technology also relates to a non-transitory machine-readable medium including instructions stored therein, which when executed by a machine, cause the machine to perform operations. The operations include receiving first voice input data from a first computing device associated with multiple user accounts. The operations also include determining, using voice recognition, a first intended voice command associated with a first user account of the plurality of user accounts and a second intended voice command associated with a second user account of the plurality of user accounts based on the first voice input data. The operations also include determining a first target computing device based on the first intended voice command. The operations also include determining a second target computing device based on the second intended voice command. The operations also include providing first instructions associated with the first intended voice command to the first target computing device for execution. The operations also include providing second instructions associated with the second intended voice command to the second target computing device for execution.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The subject technology enables a user to utilize voice commands to interact with one or more computing devices. According to various aspects, the user may register multiple computing devices with a user account associated with an online or cloud-based service. A user may register a computing device in association with the user account through authentication of user account credentials. User authentication may be initiated by signing into the user account through, for example, a web portal, a web application, an application log-in page, etc. In some cases, a user may register a computing device in association with the user account by registering a corresponding network or device identifier in association with the user account. Voice commands may be captured at any of the multiple computing devices registered with the user account. In some aspects, only voice commands captured at computing devices in which the user is currently logged into the user account may be processed according to the subject technology.

First voice input data from a first computing device associated with a user account may be received. In some aspects, second voice input data from a second computing device associated with the user account may be received. An intended voice command may be determined based on the first voice input data and the second voice input data. A target computing device may be determined based on the intended voice command, and first instructions associated with the intended voice command may be provided to the first target computing device for execution.

In one or more embodiments, the subject technology enables a user to use voice commands to interact with a computing device lacking the capabilities of capturing voice commands. For example, the user may wish to interact with a smart thermostat, which does not have a microphone. A first computing device (e.g., smartphone) may capture a voice command and transmit first voice input data to the server. The server may receive the first voice input data and determine that an intended voice command is for a second computing device different from the first computing device (e.g., smart thermostat). The server may provide instructions associated with the intended voice command to the second computing device.

Figure 1:
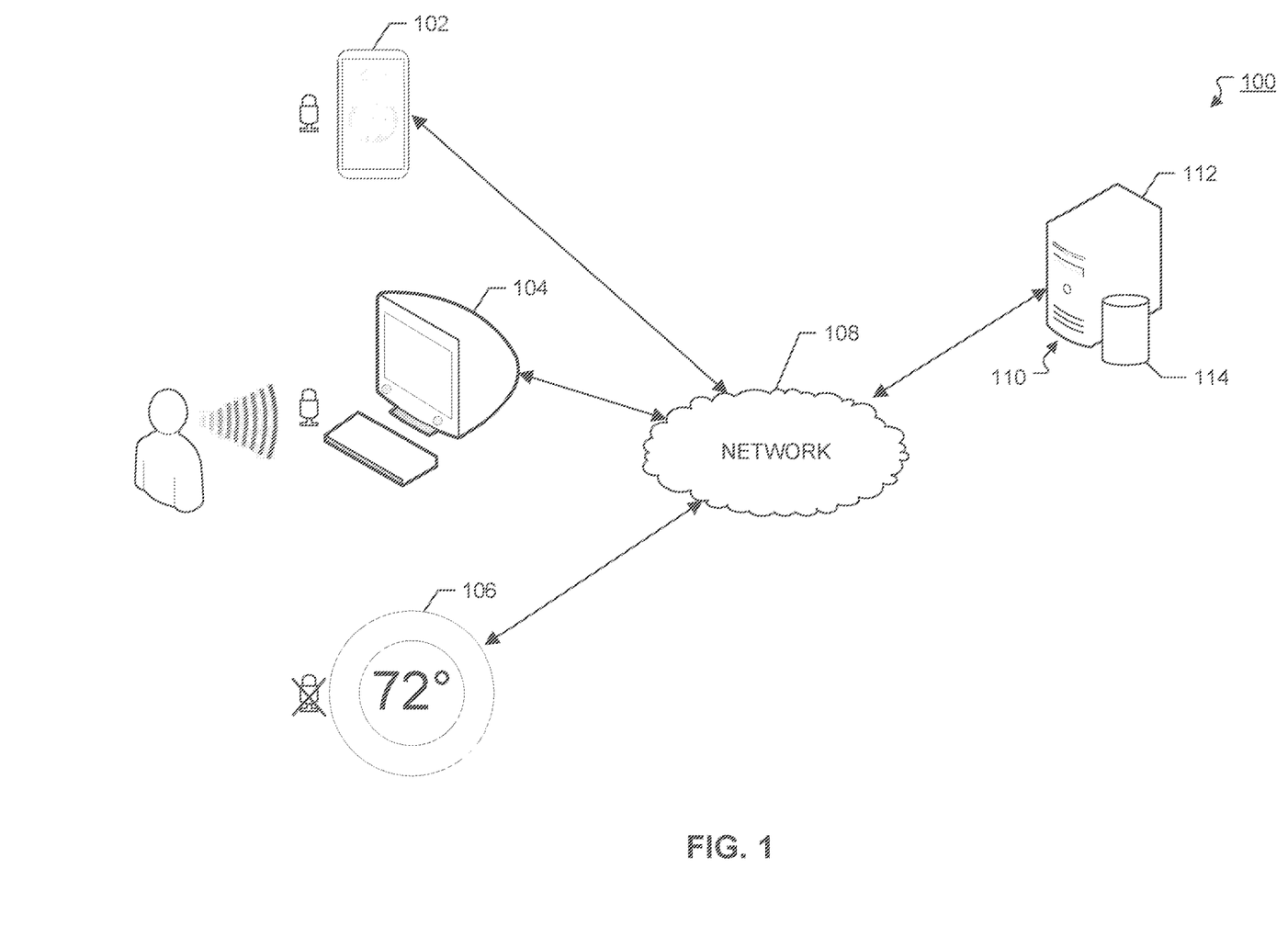
FIG. 1 illustrates an example network environment for using voice commands for one or more computing devices.

FIG. 1 illustrates an example network environment 100 in which voice commands may be utilized to interact with multiple computing devices. The network environment 100 may include one or more computing devices 102, 104 and 106, network 108, and server 110. Server 110 can include one or more computing devices 112 and one or more data stores 114.

Computing devices 102, 104 and 106 can represent various forms of processing devices. By way of example and not of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, smart appliances or a combination of any of these data processing devices or other data processing devices. Some computing devices, such as computing devices 102 and 104, may have the capabilities to capture user voice commands. For example, computing devices 102 and 104 may include microphones, and may have instructions stored in memory, which when executed by their respective processors, allow computing devices 102 and 104 to record the user voice commands. Other computing devices, such as computing device 106, may not be able to capture user voice commands because, for example, the devices lack a microphone. In addition, computing devices 102, 104 and 106 may include processing circuitry and/or instructions for speech recognition and voice recognition.

According to various implementations, computing devices 102, 104 and 106 may be associated with art online or cloud-based user account. In some cases, computing devices 102, 104 and/or 106 may be associated with multiple different cloud-based user accounts. Even when a computing device is associated with multiple different cloud-based user accounts, the computing device may be associated with one current, active user account. For example, multiple users may have previously authenticated user account credentials on a computing device, but there may be one user who is actively signed into the user account on the computing device. Information stored in connection with user accounts may be located in the data store 114 associated with the server 110. In some aspects, information stored in connection with users account may be located on a separate server (not pictured).

In some aspects, the server 110 is configured to execute computer instructions to process voice commands from one or more computing devices. When a user makes a voice command near a computing device associated with the user's account, such as computing device 102 or computing device 104, the voice command may be captured and voice input data may be transmitted to the server 110. Based on the voice input data received from the one or more computing devices associated with the user's account, server 110 may determine an intended voice command and provide instructions associated with the intended voice command to a target computing device.

The server 110 can be a single computing device (e.g., computing device 112). In other implementations, the server 110 can represent more than one computing device working together to perform the actions of a computer server (e.g., server farm). Further, the server 110 can represent various forms of servers including, but not limited to, a web server, an application server, a proxy server, a network server, or a server farm.

In some aspects, the computing devices, including computing devices 102, 104 and 106, and server 110, may communicate wirelessly through a communication interlace (not shown), which may include digital signal processing circuitry where necessary. The communication interface may provide for communications under various modes or protocols, for example, Global System for Mobile communication (GSM) voice calls, Short Message Service (SMS), Enhanced Messaging Service (BMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), etc. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks such as, for example, network 108. Network 108 can be a large computer network such as, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 104 and 106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

Figure 2:
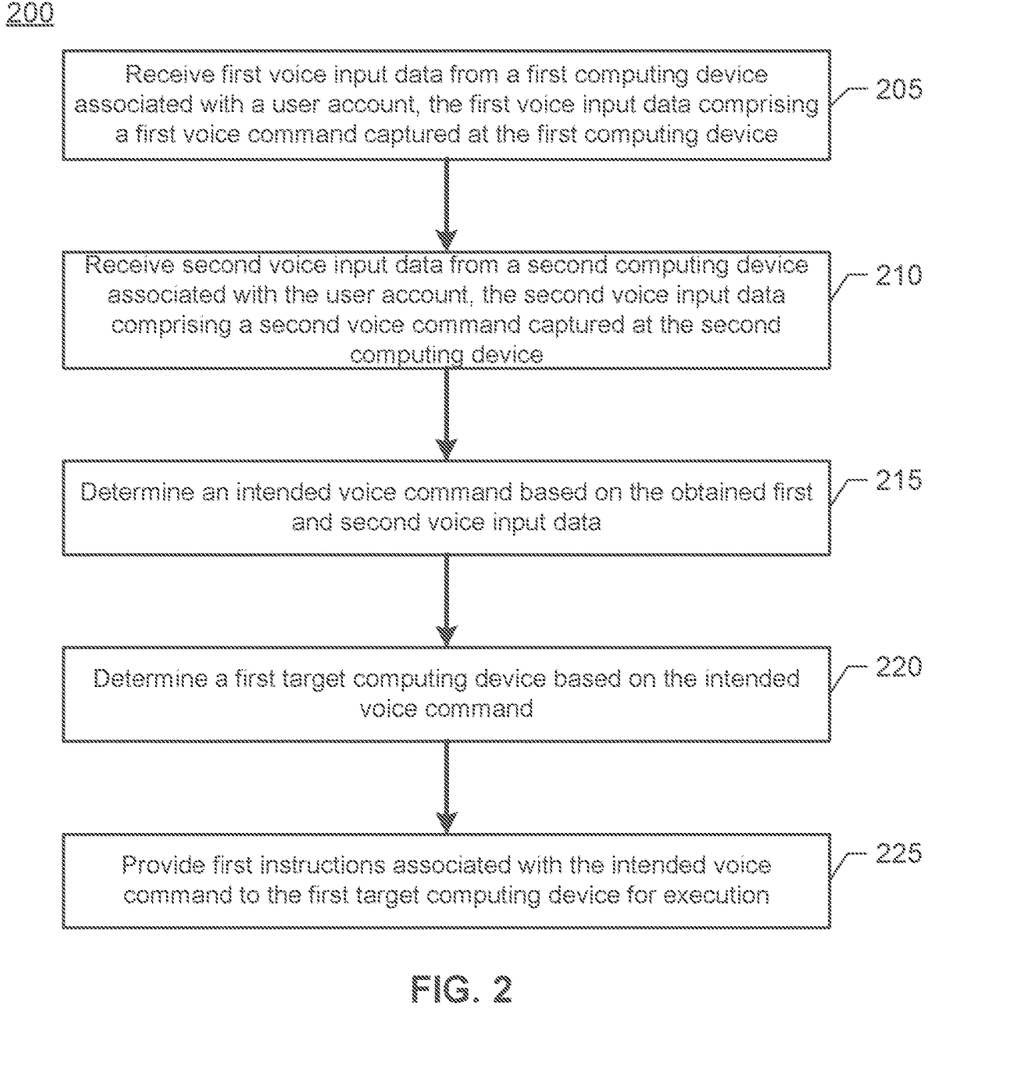
FIG. 2 shows a flowchart illustrating an example process for processing voice commands in accordance with various aspects of the subject technology.

FIG. 2 shows a flowchart illustrating an example process 200 for processing voice commands, in accordance with various aspects of the subject technology. Process 200 does not need to be performed in the order shown. It is understood that the depicted order is an illustration of one or more example approaches, and the subject technology is not meant to be limited to the specific order or hierarchy presented. Steps can be rearranged, and/or two or more of the steps can be performed simultaneously. While the steps of process 200 have been described with respect to two computing devices (e.g., computing device 102, and 104), the subject technology is understood to allow users to process voice commands in association with more than two computing devices.

In block 205 of FIG. 2, first voice input data is received from a first computing device (e.g., computing device 102) associated with a user account, where the first voice input data comprises a first voice command captured at the first computing device 102. The first voice input data may include, for example, a raw audio file captured at the first computing device 102, processed word segments based on the raw audio file, a location of the first computing device 102, a timestamp, a sound level of the audio file, etc. The server 110 may receive the first voice input data comprising the raw audio file from first computing device 102. In some aspects, the server 110 may receive the processed word segments from the first computing device 102. The first computing device 102 may capture a raw audio file of the first voice command and may process the raw audio file to determine the word segments through, for example, the use of speech recognition. The first computing device 102 may send the first voice input data comprising the determined word segments to the server 110.

In block 210 of FIG. 2, second voice input data is received from a second computing device (e.g., computing device 104) associated with a user account, where the second voice input data comprises a second voice command captured at the second computing device 104. The second voice input data may include, for example, a raw audio file captured at the second computing device 104, processed word segments based on the raw audio file, a location of the second computing device 104, a timestamp, a sound level of the audio, etc. The server 110 may receive the second voice input data comprising the raw audio file from the second computing device 104. In some aspects, the server 110 may receive the processed word segments from the second computing device 104. The second computing device 104 may capture a raw audio file of the first voice command and may process the raw audio file to determine the word segments through, for example, the use of speech recognition. The second computing device 104 may send the second voice input data comprising the determined word segments to the server 110.

In one or more implementations, the server 110 may determine whether a first voice command captured at the first computing device 102 and a second voice command captured at the second computing device 104 are related. The server 110 may receive voice input data from both the first computing device 102 and the second computing device 104. The received voice input data may be associated with the same command. For example, a voice command may be made in proximity of the first computing device 102 and the second computing device 104. Each of the computing devices may capture the voice command and send its respective voice input data to the server 110. However, some of the received voice input data may be associated with different commands. For example, a first voice command may be made in the morning and a second voice command may be made in the afternoon. In another example, a first voice command associated with a first user may be captured at the first computing device 102 and a second voice command associated with a second user may be captured at the second computing device 104. Accordingly, the subject technology may determine whether the first voice command and the second voice command are related before executing the rest of the process 200.

Various information and techniques may be used to determine whether a first voice input data and a second voice input data are related. In some aspects, the server 110 may compare a timestamp associated with the first voice input data with a timestamp associated with the second voice input data. Each of these timestamps may be associated with an internal time in respective computing devices when a voice command is captured. If the timestamp associated with the first voice input data and the timestamp associated with the second voice input data are within a predetermined time threshold, then the server 110 may determine that the first voice input data and the second voice input data are related. As described above, the server 110 may receive multiple voice input data, and it may be more likely that the first voice input data and the second voice input data are related when the timestamp associated with the first voice input data is temporally proximate to the timestamp associated with the second voice input data.

In certain circumstances, the first computing device 102 may capture a first part of the command and the second computing device 104 may capture a second part of the command. For example, the user may be moving around from a location near the first computing device 102 to a location near the second computing device 104 while speaking a voice command. The first computing device 102 may have captured only a first part of the voice command and the second computing device 104 may have captured only a second part of the voice command. In this case, the first voice input data and the second voice input data are related even though the timestamps associated with the first voice input data and the second voice input data are not identical. As such, the predetermined time threshold may be selected to allow some variability between the timestamp associated with the first voice input data and the timestamp associated with the second voice input data. The first computing device 102 and the second computing device 104 may synchronize their internal time with the server 110 periodically to make sure that a standard time is being used to generate timestamps.

In one or more implementations, the locations of each of the computing devices may also be considered. The server 110 may determine that the first voice input data and the second voice input data are related when the first computing device 102 and the second computing device 104 are located within a predetermined distance threshold. It may be more likely that the first voice input data and second voice input data are related when the location associated with the first computing device 102 is proximate to the location associated with the second computing device 104. However, when a user is moving around while issuing a command, the first voice input data and the second voice input data may be related even though the locations associated with the first computing device 102 and the second computing device 104 are not identical. As such, the predetermined distance threshold may be selected to allow some variability between the location associated with the first computing device 102 and the location associated with the second computing device 104. The location of each of the computing devices may be received by the server 110 as part of the respective voice input data or may be accessed by the server 110.

In some cases, voice recognition may also be used determine whether a first voice input data and a second voice input data are related. For example, the server 110 may access a sample voice recording of the user associated with the user account, and compare the sample voice recording with the first and second voice input data to determine that the first and second voice input data are associated with the user associated with the user account. In another example, the server 110 may compare a voice profile associated with the user account with the first and second voice input data to determine that the first and second voice input data are associated with the user associated with the user account.

In block 215 of FIG. 2, an intended voice command is determined based on the obtained first and second voice input data. In one or more implementations, the server 110 may determine that the first voice command associated with the first voice input data comprises a first part of the intended voice command and the second voice command associated with the second voice input data comprises a second part of the intended voice command. For example, the first computing device 102 and the second computing device 104 may be in different locations. A user may be moving as the user is issuing a voice command (e.g., "raise the temperature by 2 degrees"). The first computing device 102 may capture the first part of the intended voice command, for example, the phrase "raise the." The second computing device 104 may capture the second part of the intended voice command, for example, the phrase "temperature by 2 degrees." The server 110 may merge the first part of the intended voice command and the second part of the intended voice command based on the timestamps of the respective voice input data.

The server 110 may compare the timestamp associated with the first voice input data and the timestamp associated with the second voice input data. If the timestamp associated with the first voice input data and the timestamp associated with the second voice input data are within a predetermined time threshold, then the server 110 may determine that the first voice input data and the second voice input data are related. In addition, the server 110 may use speech recognition to determine the first part of the intended voice command based on the first voice input data and the second part of the intended voice command based on the second voice input data. The server 110 may determine that the determined first part of the intended voice command is not associated with commands available on any computing devices associated with the user account.

In response to determining that the first part of the intended voice command is not associated with commands available to the user, the server 110 may combine the first part of the intended voice command (e.g., "raise the") and the second part of the voice command (e.g., "temperature by 2 degrees") to determine the intended voice command (e.g., "raise the temperature by 2 degrees"). The order in which the first pail of the intended voice command and the second part of the voice command is combined may be determined based on the timestamps. For example, if the timestamp associated with the first voice input data is earlier than the timestamp associated with the second voice input data, then the second part of the intended voice command may be added to the end of the first part of the intended voice command.

In some aspects, the server 110 may receive a first set of recognized word segments from the first computing device 102 and a second set of recognized word segments from the second computing device 104. Based on methods known in the art, the computing devices may capture the voice command and process the captured voice command such that each syllable of the captured voice command is parsed and translated into a recognized word segment. The first computing device 102 may send the first set of recognized word segments to the server 110 and the second computing device 104 may send the second set of recognized word segments to the server 110. The server 110 may determine that there is an overlap of recognized word segments between the first set of recognized word segments and the second set of recognized word segments. The intended voice command may be determined based on merging the first set of recognized word segments and the second set of recognized word segments.

In one or more implementations, the server 110 may determine that the first and second voice commands each comprise the intended voice command based on a first comparison of a first timestamp and a second timestamp and a second comparison of a first location of the first computing device 102 and a second location of the second computing device 104. For example, the received first voice input data may comprise, for example, the first location of the first computing device 102 and the first timestamp when the first voice command is captured. The received second voice input data may comprise, for example, the second location of the second computing device 104 and the second timestamp when the second voice command is captured. The server 110 may compare the first timestamp and the second timestamp to determine whether the two timestamps are within a predetermined time threshold. The server 110 may compare the first location and the second location to determine whether the two locations are within a predetermined location threshold. Based on the two comparisons, the server 110 may determine that the first and second voice commands each comprise the intended voice command.

In some cases, the quality of voice commands captured at different devices may be different. For example, the user may be moving as the user is issuing a command, or the microphone associated with a computing device may be facing away from the user. In some cases, each of the computing devices that detect the voice command may capture a raw audio file of the voice command. Each of the computing devices may process the raw audio file to determine recognized word segments and respective confidence values. Based on methods known in the art, each syllable of the captured voice command is parsed and translated into a recognized word segment. The confidence value may also be calculated and may indicate the probability that the recognized word segment accurately represents the corresponding syllable of the voice command. In some cases, server 110 may receive a raw audio file associated with a voice command and may process the raw audio file to determine recognized word segments and respective confidence values.

In one or more implementations, the first voice input data may comprise a first recognized word segment and a first confidence value and the second voice input data further comprises a second recognized word segment and a second confidence value. Similar to the determination that the first voice input data is related to the second voice input data, the server 110 may determine that the first recognized word segment is related to the second recognized word segment. For example, the server 110 may determine that the difference between the timestamp associated with the first recognized word segment and the timestamp associated with the second recognized word segment is within a predetermined time threshold. The server 110 may determine the intended voice command by determining that the first recognized word segment is different from the second recognized word segment. As mentioned above, the quality of voice commands captured at different devices may be different, and the difference may be reflected as the difference in the first confidence value and the second confidence value. The server 110 may select one of the first recognized word segment or the second recognized word segment based on a comparison of the first confidence value and the second confidence value for example, a higher confidence value may indicate that there is a higher probability that a recognized word segment accurately represents the intended voice command. In this case, the server 110 may select a word segment that has a higher confidence value.

For example, the user may speak a one syllable voice command, such as "off." The first computing device 102 may process the voice command as captured on the first computing device 102 and determine a first recognized word segment, for example, a text indicating "off" and a first confidence value, for example, 0.90. The second computing device 104 may process the voice command as captured on the second computing device 102 and determine a second recognized word segment, for example, a text indicating "of" and a second confidence value, for example, 0.80. Each of the computing devices may send the respective recognized word segment to the server 110. The server 110 may determine that the first recognized word segment and the second recognized word segment are related because the difference between the timestamp associated with the first recognized word segment and the timestamp associated with the second recognized word segment is below the predetermined time threshold. The server 110 may compare the first confidence value and the second confidence value. Based on the comparison of the first confidence value (0.90) and the second confidence value (0.80), the server 110 may select "off" as the intended voice command.

In one or more implementations, the first voice input data may comprise a first set of recognized word segments and their respective first confidence values and the second voice input data may comprise a second set of recognized word segments and their respective second confidence values. The server 110 may receive the first voice input data and the second voice input data and compare each of first set of word segments with its respective second word segment. The server 110 may determine that the first set of recognized word segments is related to the second set of recognized word segments. For example, the server 110 may determine that the difference between the timestamp associated with the first set of recognized word segments and the timestamp associated with the second set of recognized word segments is within a predetermined time threshold.

The server 110 may merge the first set of recognized word segments and the second set of recognized word segments based on the respective first confidence values, and the respective second confidence values. In some aspects, the server 110 may, for each of the first set of recognized word segments, combine a first word segment with the respective second word segment when the first and the second word segments are determined to be the same, and select between the first word segment and the respective second word segment based on their respective confidence values when the first and the second word segments are determined to be different.

For example, the user may speak a voice command, such as "print document one." The first computing device 102 may process the voice command and determine a first set of word segments corresponding to "print document one," where each word segment corresponds to a syllable of the voice command. The second computing device 104 may process the voice command and determine a second set of word segments corresponding to "tint document one," where each word segment corresponds to a syllable of the voice command. The server 110 may determine that the first set of recognized word segments (for example, "print document one") is related to the second set of recognized word segments (for example, "tint document one") based on timestamps. For example, the timestamp associated with the first set of word segments and the second set of word segments may be the same, which may indicate that the first set of recognized word segments may be related to the second set of recognized word segments. The server 110 may determine that a first recognized word segment (for example, "print") among the first set of recognized word segments is different from its respective second recognized word segment (e.g., "tint") among the second set of recognized word segments. As described above, the server 110 may select a recognized word segment between the first recognized word segment (e.g., "print") and the second recognized word segment (e.g., "tint") based on their respective confidence values. In this example, the first recognized word segment may have a higher confidence value. According to the subject technology, server 110 may select the first word segment (e.g., "print") and combine the remaining word segments of the first and second word segments (e.g., document one) after determining that each of the remaining first word segments and the second word segments are the same. Based on this process, the server 110 may determine that the intended voice command is "print document one."

In block 220 of FIG. 2, a first target computing device is determined based on the intended voice command. Since multiple devices may capture a voice command, conflicts or redundancies in execution of the voice command may occur without implementations of proper method for resolving conflicts.

In one or more implementations, the intended voice command may include a device identifier associated with the first target computing device. For example, the user may state the name of the device that the user wishes to interact with. The device identifier may be stored in the data store 114 when the user registered the device with the user account. In some aspects, the server 110 may receive the device identifier as part of the voice input data. The server 110 may compare the stored device identifiers or received device identifiers with the intended voice command, and determine the first target computing device based on the comparison.

In one or more implementations, the received first and second voice input data further comprise a sound level associated with their respective voice command. The server 110 may compare a first sound level associated with the first voice command with a second sound level associated with the second voice command. The server 110 may determine, for example, that the computing device associated with a louder voice command is the first target computing device. The user may be more likely to interact with the computing device closer to the user and a computing device closer to the user may be associated with the louder voice command. In some cases, the sound level captured at the first computing device 102 and the second computing device 104 may be different even when the user is the same distance away from the first computing device 102 and the second computing device 104 due to, for example, the quality of microphones. The server 110 may receive data associated with microphones of the first computing device 102 and second computing device 104, and may standardize the first and the second sound levels based on their respective data associated with the microphone before comparing the first and second sound levels.

In one or more implementations, the received first and second voice input data comprise data associated with commands available to the user on the respective computing devices. The server 110 may compare the first data associated with commands available to the first computing device 102 to the intended voice command. The server 110 may also compare the second data associated with commands available to the second computing device 104 to the intended voice command. If the intended voice command is available to both the first computing device 102 and the second computing device 104, then other methods, such as the ones mentioned above, may be used to determine the first target computing device. If the intended voice command is available to the first computing device 102, but not available to the second computing device 104, then server 110 may determine that the first computing device 102 is the first target computing device. If the intended voice command is available to the second computing device 104, but not available to the first computing device 102, then server 110 may determine that the second computing device 104 is the first target computing device.

In some cases, the server 110 may have access to previously received voice input data. In particular, if the first and second voice input data were received within a predetermined time threshold after the previously received voice input data, then the server 110 may determine the first target computing device based on a previously determined target computing device.

For example, the server 110 may determine that the intended task is to "raise the volume by 10." The server 110 may not be able to identify the first target computing device because multiple computing devices associated with the user account (e.g., a TV, radio, other music player) may perform the intended task of "rais[ing] the volume by 10." However, if the user had previously spoken a voice command, such as "turn on the radio," then the server 110 may determine the first target computing device based on previously determined target computing device associated with the previous voice command (e.g., turn on the radio). The server 110 may have previously determined that a radio, for example, the first computing device 102, was the target computing device. If the time difference between receiving the first voice input data and data associated with the previously spoken voice command is less than a predetermined time threshold, then the server 110 may determine that the first target computing device is the first computing device 102.

In one or more implementations, the server 110 may not be able to identify a first target computing device even after performing the methods described above. In this case, the server 110 may have determined that both the first computing device 102 and the second computing device 104 may execute the user command. The server 110 may choose between the first computing device 102 and the second computing device 104 based on additional background data. In some aspects, the server 110 may have access to background data associated with each of the computing devices associated with the user account. The background data may include, for example, frequency and duration of user use of a computing device, current battery level, screen size (if applicable), etc. In some aspects, the server 110 may determine the first target computing device based on a comparison of background data associated with the first computing device 102 and background data associated with the second computing device 104. For example, if the frequency of user use of the first computing device 102 is higher than the frequency of user use of the second computing device 104, then the server 110 may determine that the first computing device 102 is the target computing device. In another example, if the current battery level of the first computing device 102 is higher than the current battery level of the second computing device 104, then the server 110 may determine that the first computing device 102 is the target computing device.

In block 225 of FIG. 2, instructions associated with the intended voice command are provided to the first target computing device for execution. In some aspects, the intended voice command may be associated with a first target computing device and a second target computing device. The server may receive first voice input data from a first computing device 102 and a second voice input data from a second computing device 104. The server 110 may determine an intended voice command and determine the first target computing device and the second target computing device. The server 110 may provide first instructions associated with the intended voice command to the first target computing device and second instructions associated with the intended voice command to the second target computing device. For example, the user may wish to transfer photos from the first computing device 102 to second computing device 104. The first target computing device may be the first computing device 102 and the second target computing device may be the second computing device 104. The first instructions may be associated with initiating a photo transfer application on the first computing device 102. The second instructions may be associated with accepting the photo transfers from the first computing device 102 on the second computing device 104. In some aspects, the first instructions associated with the intended voice command and the second instructions associated with the intended voice command may be the same. For example, the user may wish to "turn off" multiple computing devices. The server 110 may send the same instructions to the first target computing device and the second target computing device.

In one or more implementations, the server 110 may receive user feedback data associated with the provided instructions. In some aspects, after the first instructions are provided to the first target computing device, the server 110 may determine that receiving an indication of user interaction from a computing device that is not the first target computing device within a predetermined time threshold may indicate that the determination of the intended voice command was incorrect. The server 110 may store an entry of the first voice input data, the second voice input data and the indication of user interaction for future reference. Next time the server 110 receives voice input data, the server 110 may compare the voice input data with previously stored entries. Future determination of an intended voice command and a target computing device may be further based on the previously stored entries.

Although the first computing device 102 and the second computing device 104 are described as being associated with a single user account, it is understood that the first computing device 102 and the second computing device 104 may be associated with different user accounts. For example, the first computing device 102 may receive a first voice command from a first user and the second computing device 104 may receive a second voice command from a second user. The first and the second voice commands may be associated with the same target computing device. The server 110 may receive first voice input data comprising the first voice command from the first computing device 102 and second voice input data comprising the second voice command from the second computing device 104. The server 110 may determine that the first voice input data are associated with the first user of the first user account and that the second voice input data are associated with the second user of the second user account. The server 110 may determine a first intended voice command based on the first voice input data and a second intended voice command based on the second voice input data. The server 110 may further determine that target computing device is associated with the first user account and the second user account and that the first intended voice command and the second intended voice command are conflicting. In some cases, the server 110 may send instructions to computing devices 102 and 104. In response, the computing devices 102 and 104 may provide for display graphical user elements to receive further instructions or confirmations from the first and the second users. The users may select which instruction has priority. In other cases, certain user accounts associated with the target computing device may have higher priority or privileges. In this case, the server 110 may transmit instructions associated with a user account with the highest priority to the target computing device.

Figure 3:
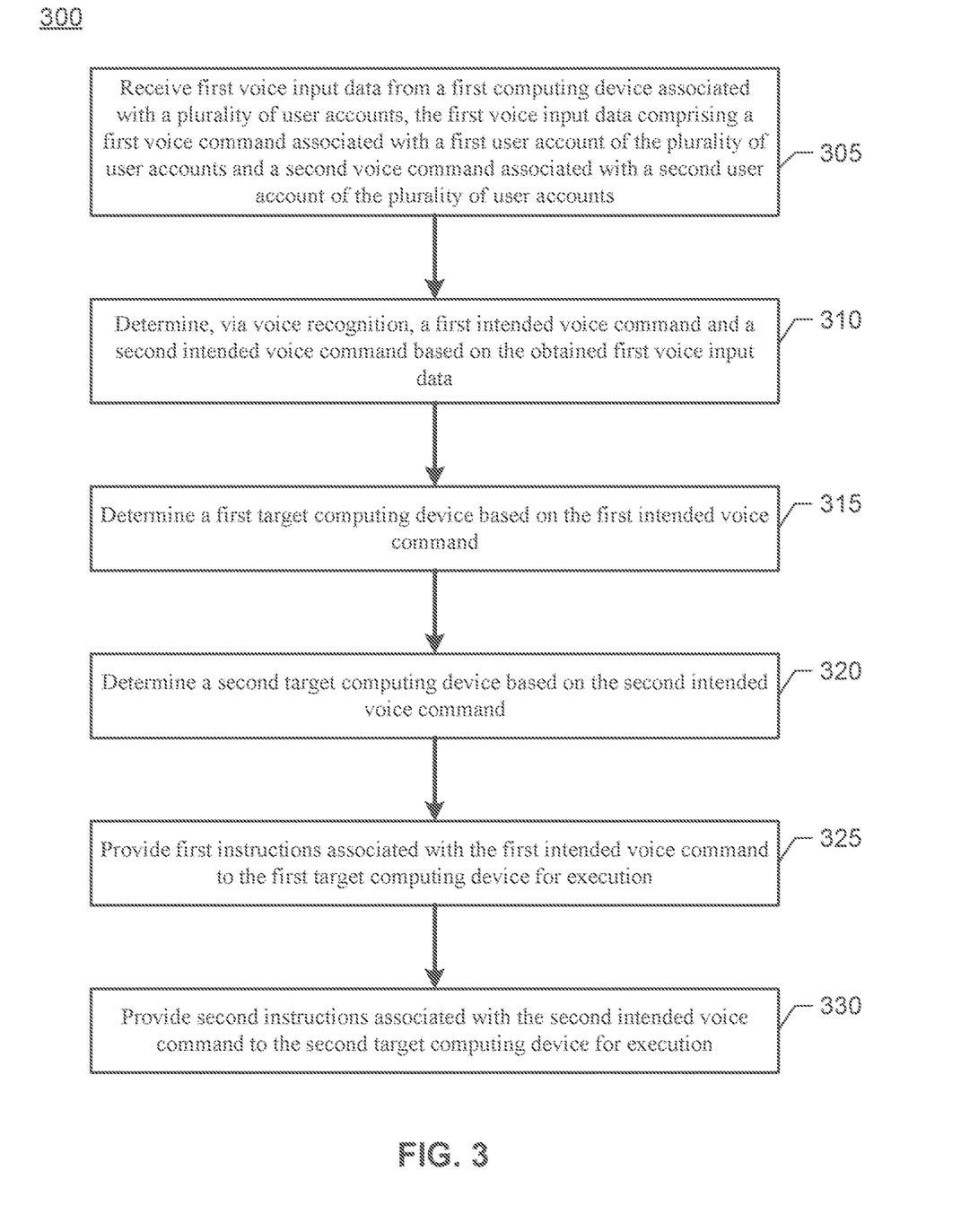
FIG. 3 shows a flowchart illustrating an example process for processing voice commands in accordance with various aspects of the subject technology.

FIG. 3 shows a flowchart illustrating an example process 300 for providing first instructions associated with an intended voice command to a target computing device, in accordance with various aspects of the subject technology. The steps of the process 300 do not need to be performed in the order shown. It is understood that the depicted order is an Illustration of one or more example approaches, and the subject technology is not meant to be limited to the specific order or hierarchy presented. The steps can be rearranged, and/or two or more of the steps can be performed simultaneously.

In block 305 of FIG. 3, first voice input data is received from a first computing device associated with multiple user accounts, where the first voice input data comprise a first voice command associated with a first user account of the multiple user accounts and a second voice command associated with a second user account of the multiple user accounts. A first user and a second user may speak voice commands within a predetermined time threshold near the first computing device 102 and the first computing device 102 may capture both the first voice command and the second voice command as, for example, a single audio file and send the audio file to the server 110.

In block 310 of FIG. 3, a first intended voice command and a second intended voice command are determined based on the first voice input data. The server 110 may use voice recognition techniques to identify users associated with the obtained first voice input data. For example, the server 110 may receive an audio file comprising multiple commands from multiple users. The server 110 may separate the audio file into multiple portions, where the portions of the raw audio file may be associated with different users.

For example, the first computing device 102 may be associated with a first user account and a second user account. The first user may speak a voice command, such as, "raise the volume of the TV by 20" near the first computing device 102 and the second user may also issue a voice command, such as, "raise the temperature to 100" near the first computing device 102. The two voice commands may be detected in close temporal proximity of each other and may overlap. For instance, the phrase "raise the volume of the TV by" may be detected at $t_0$, the phrase "raise the temperature to" may be detected at $t_1$, the phrase "20" may be detected at $t_2$, and the phrase "100" may be detected at $t_3$. The first computing device 102 may determine the speaker associated with each of the phrases that was detected through use of voice recognition techniques. The first computing device 102 may determine that the phrase "raise the volume of the TV by" and "20" are associated with the first user based on, for example, comparison of a voice profile associated with the first user account and the detected phrases. The first computing device 102 may further determine that the phrase "raise the temperature to" and "100" are associated with the second user based on, for example, comparison of a voice profile associated with the second user account and the detected phrases. Based on these determinations, the first computing device 102 may create a first portion of the raw audio file associated with the first user and a second portion of the raw audio file associated with the second user. These portions of the raw audio file may be sent to the server 110. In some implementations, the server 110 may receive a raw audio file associated with the first user and the second user, and may distinguish the command from the first user and the command from the second user based on the above process.

In block 315 of FIG. 3, first target computing device is determined based on the first intended voice command. In block 320 of FIG. 3, second target computing device is determined based on the second intended voice command. The first and the second target computing device may not have a microphone and/or may not have captured the voice command. For example, the user may wish to change the temperature of the house, and may speak a voice command, such as "raise temperature by three degrees," near the user's smartphone. Computing device 102 (e.g., a smartphone) may capture the voice command and send the first voice input data to the server 110. The server 110 may determine that a computing device 106 (e.g., a smart thermostat) is the first target computing device. In some implementations, the voice command may include a device identifier. The server 110 may access a list of computing devices associated with the user account and determine that the computing device 106 is the first target computing device. In some implementations, the computing device 106 may send data, which may comprise for example, location of the computing device 106, commands available to the user on computing device 106, etc. The server 110 may compare the intended voice command to the commands available to the user on computing devices associated with the user account. If the intended voice command is a command available to the user on computing device 106, then server 110 may determine that the computing device 106 is the first target computing device.

In block 325 of FIG. 3, first instructions associated with the first intended voice command are provided to the first target computing device for execution. In block 330 of FIG. 3, second instructions associated with the second intended voice command to the second target computing device is provided for execution.

Figure 4:
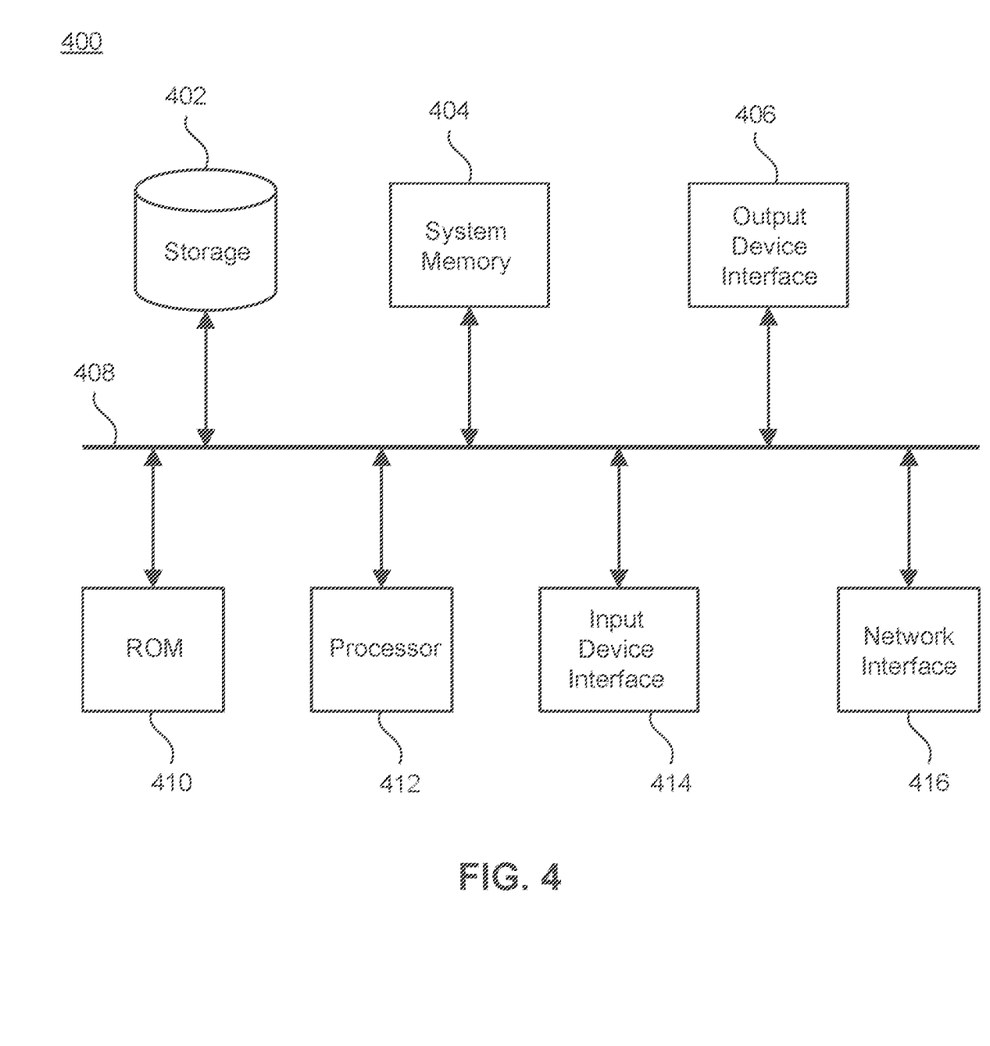
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as a random access memory. System memory 404 stores some of the instructions and data that the processor needs at runtime. In some implementations, the processes of the subject disclosure are stored in system memory 404, permanent storage device 402, or ROM 410. For example, the various memory units include instructions for displaying web pages, processing user entries to the web pages, and generating URLs, in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network (LAN), a wide area network (WAN), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user; for example, by sending web pages to a web browser on a user s client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method comprising:
receiving, at data processing hardware, a registration request to register a first computing device in association with a cloud-based user account for a user, the registration request comprising:
authenticated user account credentials for the cloud-based user account; and
a device identifier associated with the first computing device;
receiving, at the data processing hardware, from a second computing device associated with the cloud-based user account for the user, voice input data corresponding to a voice command spoken by the user, wherein:
both the first computing device and the second computing device captured at least a portion of the voice command spoken by the user; and
the voice command includes the device identifier associated with the first computing device;
identifying, by the data processing hardware, using the device identifier associated with the first computing device included in the voice command, the first computing device as a target computing device for providing first instructions associated with the voice command;
comparing, by the data processing hardware, the voice input data with a voice profile for the user to determine that the voice input data is associated with the cloud-based user account for the user; and
based on determining that the voice input data is associated with the cloud-based user account, transmitting, by the data processing hardware:
to only the first computing device, the first instructions associated with the voice command for execution by the first computing device to perform a first action; and
to the second computing device, second instructions associated with the voice command for execution by the second computing device to perform a second action, the second action performed by the second computing device executing the second instructions different than the first action performed by the first computing device executing the first instructions.

2. The method of claim 1, wherein the second computing device captured the voice command spoken by the user via a microphone of the second computing device.

3. The method of claim 1, wherein the first computing device captured the voice command spoken by the user via a microphone of the first computing device.

4. The method of claim 1, wherein the first computing device comprises a media player.

5. The method of claim 1, further comprising, after receiving the registration request to register the first computing device in association with the cloud-based user account:
storing, by the data processing hardware, the device identifier in a list of device identifiers each associated with a respective computing device associated with the cloud-based user account for the user,
wherein identifying the first computing device as the target computing device comprises accessing the list of device identifiers using the device identifier included in the voice command to identify the first computing device as the target computing device.

6. The method of claim 1, wherein the data processing hardware, the first computing device, and the second computing device are in communication with one another via a network.

7. The method of claim 1, wherein:
the first computing device and the second computing device are located in a household of the user; and
the data processing hardware resides on a remote server.

8. The method of claim 1, further comprising, prior to identifying the first computing device as the target computing device, determining, by the data processing hardware, that the voice command is available to both the first computing device and the second computing device.

9. The method of claim 1, wherein the authenticated user account credentials are obtained by signing into the cloud-based user account through a web application.

10. The method of claim 1, wherein the second computing device is associated with multiple different cloud-based user accounts each associated with a different user.

11. A system comprising:
data processing hardware; and
memory hardware storing instructions that when executed on the data processing hardware cause the data processing hardware to perform operations comprising:
receiving a registration request to register a first computing device in association with a cloud-based user account for a user, the registration request comprising:
authenticated user account credentials for the cloud-based user account; and
a device identifier associated with the first computing device;
receiving, from a second computing device associated with the cloud-based user account for the user, voice input data corresponding to a voice command spoken by the user, wherein:
both the first computing device and the second computing device captured at least a portion of the voice command spoken by the user; and
the voice command includes the device identifier associated with the first computing device;
identifying, using the device identifier associated with the first computing device included in the voice command, the first computing device as a target computing device for providing first instructions associated with the voice command;
comparing the voice input data with a voice profile for the user to determine that the voice input data is associated with the cloud-based user account for the user; and
based on determining that the voice input data is associated with the cloud-based user account, transmitting:
to only the first computing device, the first instructions associated with the voice command for execution by the first computing device to perform a first action; and
to the second computing device, second instructions associated with the voice command for execution by the second computing device to perform a second action, the second action performed by the second computing device executing the second instructions different than the first action performed by the first computing device executing the first instructions.

12. The system of claim 11, wherein the second computing device captured the voice command spoken by the user via a microphone of the second computing device.

13. The system of claim 11, wherein the first computing device captured the voice command spoken by the user via a microphone of the first computing device.

14. The system of claim 11, wherein the first computing device comprises a media player.

15. The system of claim 11, wherein the operations further comprise, after receiving the registration request to register the first computing device in association with the cloud-based user account:
   storing the device identifier in a list of device identifiers each associated with a respective computing device associated with the cloud-based user account for the user,
   wherein identifying the first computing device as the target computing device comprises accessing the list of device identifiers using the device identifier included in the voice command to identify the first computing device as the target computing device.

16. The system of claim 11, wherein the data processing hardware, the first computing device, and the second computing device are in communication with one another via a network.

17. The system of claim 11, wherein:
   the first computing device and the second computing device are located in a household of the user; and
   the data processing hardware resides on a remote server.

18. The system of claim 11, wherein the operations further comprise, prior to identifying the first computing device as the target computing device, determining that the voice command is available to both the first computing device and the second computing device.

19. The system of claim 11, wherein the authenticated user account credentials are obtained by signing into the cloud-based user account through a web application.

20. The system of claim 11, wherein the second computing device is associated with multiple different cloud-based user accounts each associated with a different user.

* * * * *